June 12, 1951 R. C. WAPPNER 2,556,862
THERMOMETER CONSTRUCTION
Filed Sept. 19, 1947
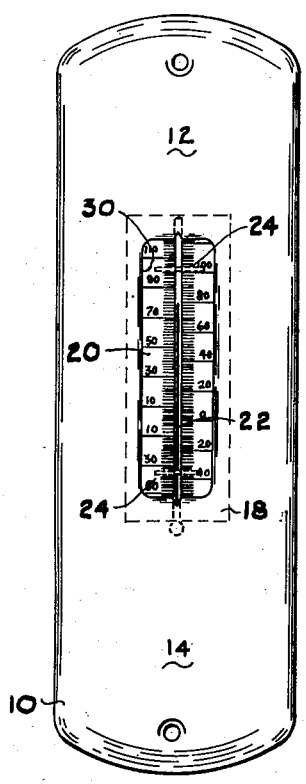
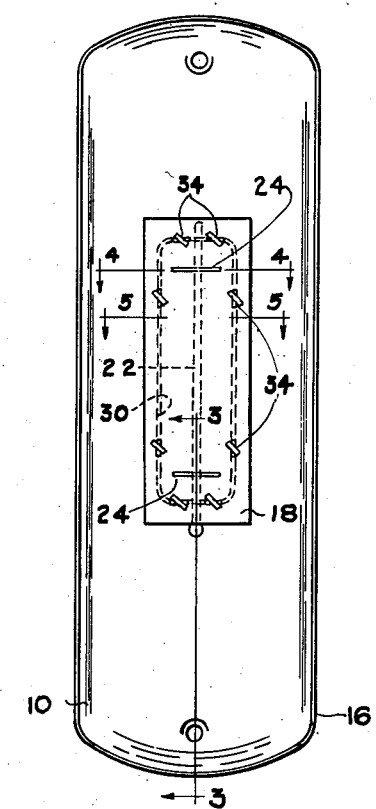
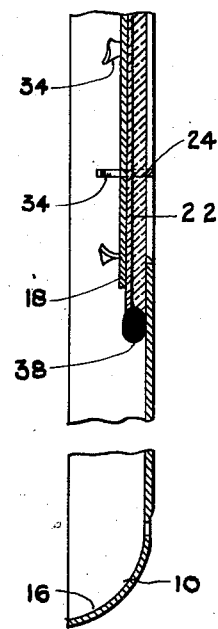
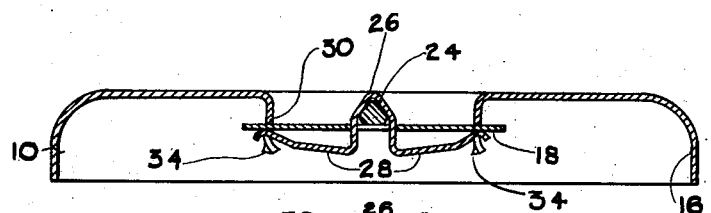
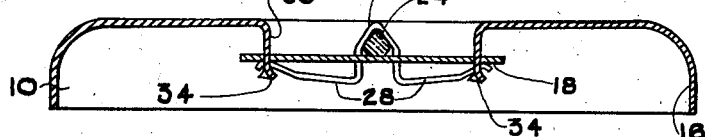
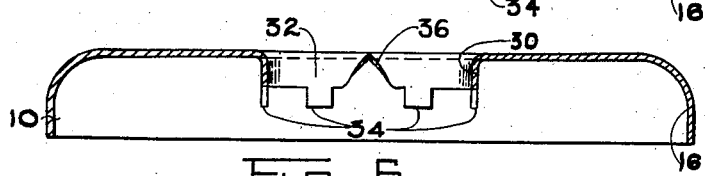
INVENTOR
RALPH C. WAPPNER
BY
Toulmin & Toulmin
ATTORNEYS Patented June 12, 1951

2,556,862

UNITED STATES PATENT OFFICE 2,556,862

THERMOMETER CONSTRUCTION

Ralph C. Wappner, Springfield, Ohio, assignor to The Ohio Thermometer Co. Inc., Springfield, Ohio, a corporation of Ohio Application September 19, 1947, Serial No. 774,968

7 Claims. (Cl. 73—376)

This invention relates to thermometers, and particularly to a type of construction therefor especially adapted for use in connection with outdoor advertising thermometers.

The usual type outdoor advertising thermometer consists of a fairly large panel having printed thereon certain advertising information and also having printed on the panel a thermometer scale relative to which a thermometer tube is properly mounted.

It has been customary in connection with thermometers of this type to construct the panel from a single sheet of metal having a planar front surface and on which surface the thermometer tube is mounted.

Due to the fact that thermometers of this type are usually mounted outdoors, there is great likelihood the thermometer tube will be broken because it projects forwardly of the thermometer face.

When the tubes in thermometers of this nature are broken the item becomes practically useless because it is difficult to procure a thermometer tube which is calibrated for the particular scale printed on the thermometer.

Ordinarily the advertising thermometer as described above is supplied as a complete unit by the thermometer manufacturer. However, it may be desirable in certain instances for the advertiser to purchase his panels from an establishment better adapted for manufacturing such items and to purchase the thermometer equipment from a thermometer company.

Should this be advantageous it would be difficult, according to present methods of manufacture, to assemble the parts properly to produce a thermometer which would indicate the temperature properly.

In the preparing of the large panels for advertising thermometers of the type wherein the thermometer scale is printed directly on the said panel, the placing of the said scale on the panel is a fairly expensive operation and one which, if not properly done, ruins the entire workpiece.

Also, the complete panel must be passed through the assembly line for mounting the thermometer tube thereon with the likelihood that it will become damaged in some manner during its passage.

The primary object of the present invention is to provide an improved type construction for thermometers, and especially for outdoor thermometers.

A still further object is to provide a thermometer construction especially adapted for outdoor advertising thermometers wherein the thermometer proper, including the scale therefor, is fabricated separately from the main panel part of the thermometer.

A still further object of this invention is the provision of a type of thermometer construction wherein the thermometer and scale part are separately formed and detachably secured to the main thermometer panel.

These and other objects and advantages will become more apparent upon reference to the following description taken in connection with the accompanying drawings in which:

Figure 1 is a front elevational view of a typical thermometer constructed according to this invention;

Figure 2 is a rear view thereof showing how the thermometer assembly is secured to the main panel part;

Figure 3 is a somewhat enlarged vertical section showing the position which the thermometer tube occupies relatives to the main panel and is indicated by the line 3—3 on Figure 2;

Figures 4 and 5 are enlarged plan sections indicated by the lines 4—4 and 5—5 on Figure 2; and Figure 6 is a view similar to Figure 4 but showing the main panel before the thermometer assembly has been mounted thereon.

Referring to the drawings, the thermometer shown therein comprises a main panel 10 having open space at the top and bottom thereof as indicated by the reference numerals 12 and 14 and on which it is desired to place advertising information such as a firm name, the products manufactured or handled thereby, and other pertinent sales data.

In order to give the panel 10 some rigidity, and to somewhat improve the appearance thereof, it is formed into a pan shape with a flange turned backwardly therefrom and extending completely around as indicated at 16. This not only strengthens the panel 10 and improves the appearance also, but also provides a space behind the front of the panel which, according to this invention, is utilized for receiving the thermometer proper.

The thermometer proper referred to above consists of a panel 18 having a scale 20 printed thereon and a spirit tube 22 which is mounted on the panel 18 and secured thereto by the spring clips 24 best seen in Figures 4 and 5. The spring clips 24 are more fully shown and described in the George Dean Hunt application, now abandoned Serial No. 775,009 filed September 19, 1947, for Retaining Clip, and assigned to the same assignee as the instant application.

The spring clips, in general, comprise resilient members having U-shaped center parts as at 26 and arms 28 extending laterally therefrom.

To mount the spirit tube 22 in position, the clips are placed with the center part extending through the apertures 30 in the panel 18, and are then depressed until the opening between the part 26 and the panel will receive the spirit tube.

When the spirit tube is properly positioned the pressure on the clips is released and the part 26 thereof is retracted by the arms 28 to clamp the tube against the base of the panel.

The center part of the panel 10 has an aperture 30 behind which the panel 18 is mounted and this aperture has a turned-in flange part indicated by the reference numeral 32. The back edge of the flange part 32 forms a surface against which the panel 18 rests, and projecting rearwardly from the said flange are a plurality of tabs 34 receivable in slots around the edge of the panel. After the panel is placed in position the tabs are turned or twisted as shown in Figures 2 and 3 and the panel 18 is thus tightly held in place.

In order to accommodate the spirit tube 22 which extends up the face of the panel 18, the flange 32 has V-shaped notches cut in the centers of the end parts thereof as shown at 36. This permits the tube to extend beyond the edge of the aperture 30 at the top and bottom and to make a more neat appearing assembly.

Also, the bulb 38 at the lower end of the tube lies against the back face of the main panel 10 and is thus in position to respond quickly to changes in temperature.

It will be evident, especially in Figures 3, 4 and 5, that the thermometer tube is completely behind the plane of the forward surface of the panel 10. This operates to protect the spirit tube against accidental breakage which is quite frequent in connection with outdoor thermometers.

From the foregoing it will be evident that the present invention provides for a thermometer construction wherein the main panel part, and which is to carry advertising material, is separately fabricated from the thermometer part proper, which includes a spirit tube and a panel bearing the thermometer scale. Thus, these items can be separately produced if desired and brought together for assembly at still a third station.

The printing of the main panel and the printing of the thermometer panel can be carried out individually, according to methods and procedures best suited for that particular type of work.

It will also be observed that the replacement of the thermometer part of an assembly according to this invention is quite simple and that should the spirit tube of the thermometer become broken, the main panel portion could still be utilized merely by replacing the sub-assembly consisting of the spirit tube and its scale bearing panel.

It will be understood that this invention is susceptible to modification in order to adopt it to different usages and conditions and, accordingly, it is desired to comprehend such modifications within this invention as may fall within the scope of the appended claims.

I claim:
1. In a thermometer; a main panel having an aperture therein, a peripheral flange extending rearwardly from the edge of said aperture, a thermometer assembly comprising a scale bearing panel and a spirit tube secured thereto, said scale bearing panel being mounted against the rear edge of said flange, and tabs extending from said flange and through said scale bearing panel and twisted or bent over to secure said panels together.

2. In a thermometer; a main panel having a central aperture therein, a peripheral flange on said aperture extending rearwardly therefrom, said flange having a V-shaped indentation extending inwardly from the edge of the flange portions extending across the ends of said aperture, a scale bearing panel and a spirit tube secured thereto, said scale bearing panel being mounted against the rear edge of said flange and said spirit tube extending into said indentations, and means detachably securing said panels together, said means comprising tabs extending rearwardly from said flange through said scale bearing panel and being twisted or bent over.

3. In a thermometer assembly especially adapted for use as an outdoor advertising thermometer; a main panel having a substantial portion of its area open for receiving advertising copy, said main panel having a central aperture in said panel and adapted with a flange turned back from the edge thereof, a scale bearing panel larger than said aperture and mounted against the rear edge of said flange, tabs extending from said flange and through said scale bearing panel for being twisted to hold said panels together, a spirit tube of greater length than said aperture mounted on said scale bearing panel, and resilient means retaining said tube in position on said scale bearing panel.

4. In a thermometer assembly especially adapted for use as an outdoor advertising thermometer; a main panel having a substantial portion of its area open for receiving advertising copy, said main panel having a central aperture in said panel and adapted with a flange turned back from the edge thereof, a scale bearing panel larger than said aperture and mounted against the rear edge of said flange, tabs extending from said flange and through said scale bearing panel for being twisted to hold said panels together, a spirit tube of greater length than said aperture mounted on said scale bearing panel, and resilient means retaining said tube in position on said scale bearing panel, the parts of said flange adjacent said tube being notched for permitting said tube to pass therethrough.

5. In a thermometer assembly especially adapted as an outdoor advertising thermometer; a main panel having a substantial portion of its surface adapted for having printed thereon advertising copy, a central aperture in said panel having a flange turned back around the periphery thereof, a thermometer assembly comprising a scale bearing panel and a spirit tube mounted thereon mounted against the rear edge of said flange, tabs extending from said flange and through said scale bearing panel for being twisted to retain said panels together, and notches in said flange through which said tube extends, the depth of said flange being such that the bulb of said tube bears against the rear surface of said main panel.

6. As a new article of manufacture for use in thermometer assemblies; a main panel, a central aperture in said panel of such a size as to leave a large part of the surface of said panel for receiving printed material, a flange extending rearwardly from the periphery of said aperture, notches in said flange at each end of said aperture for receiving the spirit tube of a thermometer assembly mounted against the rear edge of said flange, a plurality of tabs spaced around said flange and extending rearwardly therefrom for securing the said thermometer assembly to said panel, a secondary panel for mounting a thermometer thereon, and there being a plurality of slots around the periphery of last said panel for receiving correspondingly shaped tabs extending from said flange on which said panel is to be mounted.

7. In a thermometer; a main panel having an aperture therein with a peripheral flange extending rearwardly from the edge of said aperture; a scale bearing panel and a spirit tube secured thereto, said scale bearing panel being adapted to be mounted against the rear edge of said flange whereby said scale and tube will be visible through said aperture; and means for securing said panels together comprising tabs on one of said panels adapted to pass through the other of said panels and to be turned transverse to the normal position whereby said panels are secured together.

RALPH C. WAPPNER.

REFERENCES CITED

The following references are of record in the file of this patent:

UNITED STATES PATENTS

| Number | Name | Date |
| --- | --- | --- |
| 1,132,426 | Beach | Mar. 16, 1915 |
| 1,556,866 | Mueller | Oct. 13, 1925 |
| 1,909,391 | Brown | May 16, 1933 |